Feb. 4, 1964 H. SAUSE, JR 3,120,370
LOAD BINDING MECHANISM
Filed June 5, 1961

Henry Sause, Jr.
INVENTOR.

BY Ramsey and Kolisch
Attys.

United States Patent Office 3,120,370
Patented Feb. 4, 1964

3,120,370
LOAD BINDING MECHANISM
Henry Sause, Jr., 217 Terminal Sales Bldg.,
Portland 5, Oreg.
Filed June 5, 1961, Ser. No. 115,040
9 Claims. (Cl. 248—361)

This invention relates to mechanism for binding articles securely in place, and more particularly to such mechanism having elognated tension members or chains and novel means for tensioning the members or chains to tighten them about a load.

The invention is described below in connection with securing a load of lumber in place on a lumber barge. It should be obvious, of course, that the invention has other applications, where similar loading problems are encountered.

In tying a load of lumber down on a platform or deck of a barge, it is desirable that the mechanism or means used easily be actuated to produce tightening of the tension members employed. It is also advantageous that the mechanism be able to withstand high stresses without failure, and that the mechanism be light and compact enough to be easily manipulated by a workman. Also important is that the mechanism have means for loosening it from a load, prior to the unloading, with such means constructed so that a load is safe from accidental loosening during transport. Further, it is desirable that the mechanism be able to secure with equal facility both compact and bulky loads, and that with either type of load the mechanism be devoid of loose and dangling ends in the tension members used.

A general object of the invention is to provide improved means for binding together the articles of a load, which takes care of the above requirements in a highly practical and satisfactory manner.

More specifically, it is an object of the invention to provide novel mechanism for tying down a load that features a running unit mounting a wheel or sprocket for training a tension member such as a chain, and means for turning the wheel to produce tension in the tension member.

Another object is to provide mechanism for cinching a load in place, comprising a holding unit normally anchored by the end of one chain, and a running unit in operative position opposite the holding unit, such holding and running units each mounting a wheel or sprocket, with another chain passing from the running unit around the wheel or sprocket of the holding unit and thence about the sprocket of the running unit. On manually rotating the sprocket of the running unit, the chain trained thereover and the chain anchoring the holding unit are tensioned, with accompanying cinching in place of a load enveloped by the chains.

Yet another object is to provide improved means for securing and holding a load in place, that employs chains to bind the load and, as a means training a chain, chain sprockets with spaced recesses about their perimeters adapted snugly to receive spaced links of a chain. Positive traction exists between the sprockets and chain, with the result that when a sprocket is turned under power, a corresponding take-up in the chain occurs that has a fixed relation to the amount the sprocket is turned. Further, chain trained over the sprockets may be placed under high tension, without tendencies of the chain to deform as it travels around a sprocket with a resulting change of pitch in the chain.

A further object of the invention is the provision of mechanism for binding a load, utilizing chains extending down on either side of the load toward the platform or means supporting it, where portions of the chains are anchored in place on either side of the load by detachable means, and more specifically by detachable means constructed to enable positive attachment with a chain at multiple locations along its length. When tensioning a chain, it is important that it not be twisted, and by disconnecting the chains on the sides of a load prior to final tensioning, any twisting observed therein may be removed rapidly and easily. It should also be noted that ordinarily in a lumber barge the running and holding units briefly described above are mounted on top of the lumber load in a position where a workman may readily actuate them to produce tensioning of the chains. By detachably anchoring the chains, it is an easy matter to adjust the length of chain that extends up and over a load, whereby with large- and small-sized loads corresponding long and short lengths of chain are present. Excess chain is stored at the sides of the load, in a manner whereby it is protected and out of the way.

A further feature of the invention is the provision of novel means for quickly releasing the tension members of chains employed to bind articles in a load together, when it becomes time to unload.

Other features and objects of the invention will become more apparent, as the following description is read in conjunction with the accompanying drawings, wherein.

Figure 1:
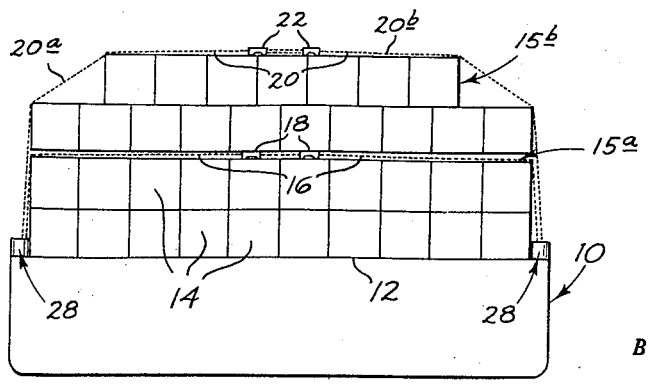
FIG. 1 is a somewhat simplified, cross sectional view of a lumber barge and illustrating how the bundles may be tied down on the barge as contemplated by an embodiment of the invention.

Referring now to the drawings, where an embodiment of the invention is illustrated, and first of all more particularly to FIG. 1, 10 indicates the hull of a lumber barge, and 12 a deck or loading platform in the barge. Supported on deck 12 is a load of lumber, shown in FIG. 1 as a plurality of lumber bundles 14 stacked beside and on top of each other. The scale of the drawing prevents the showing of the individual pieces of lumber in a bundle, but it should be understood that each bundle comprises plural pieces of lumber stacked and suitably bound together.

Typically, the load of lumber may be divided into lower and upper levels, with each level at regular modules along the length of the hull being securely tied down on deck 12. Thus, 15a indicates a lower level of lumber bundles, and this is secured to deck 12 by an expanse of chain 16 and cinching mechanism 18. At 15b the upper level of lumber bundles is indicated, and this level is secured on top of the lower level and to deck 12 by an expanse of chain 20 and cinching mechanism 22. Expanse of chain 20, and expanse of chain 16, are also referred to herein as elongated tie-down means. Were one to view the side of the barge, similar expanses of chain and cinching mechanisms would appear at regular spacings of, for example, some five to ten feet along the length of the barge.

Explaining now more specifically expanse of chain 20 and mechanism 22 securing the upper level of bundles in place, a length of chain 20a extends up one side and over the top of the lumber load, and another length of chain 20b extends up the other side and over the top of the lumber load toward the first-mentioned length of chain. The two lengths of chain have their bottom set of ends anchored in place by anchoring means indicated generally at 28. Cinching mechanism 22 on top of the load interconnects the top or upper set of ends of the chain lengths.

Referring now to FIGS. 2, 3, 4, and 5, where cinching mechanism 22 is more clearly shown, 30 indicates a holding unit in the mechanism which is connected to the upper end of length of chain 20b. The unit comprises a pair of laterally spaced frame plates 30a and 30b, with edges 32, 33 at the base of the plates operable to support the unit on the top of the load of lumber. Adjacent one set of ends of the plates, and journaled on the plates, is a chain sprocket or training wheel 36. Rigidly interconnecting the other set of ends of the plates is a brace plate 38.

Figure 2:
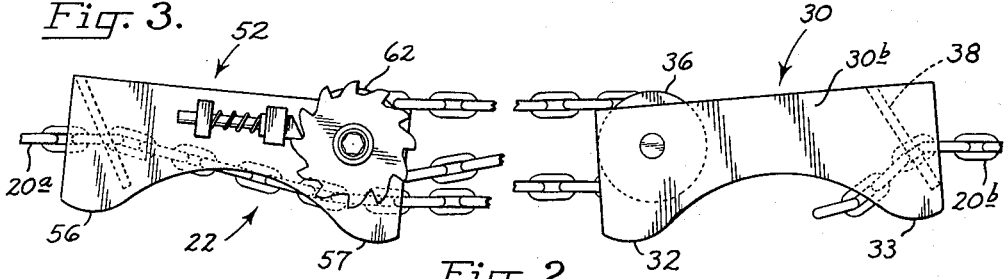
FIG. 2 is a view, somewhat enlarged, of holding and running units that are part of the binding mechanism of the invention, and showing them as they typically might position themselves after the tensioning of two lengths of chain interconnected by the units.

Length of chain 20b has an end fastened to the holding unit, and this is done by extending the end through an aperture 40 provided in the brace plate. Aperture 40 has a notch 42 at the base thereof, shaped to receive a vertically disposed link in the length of chain as shown in FIG. 2. With such a link in place, the next following cross link abuts the inside of the brace plate to prevent withdrawal of the chain end. The notch therefore constitutes detachable means for locking positively an end of the chain length to the holding unit.

Sprocket 36 has multiple recesses 44 distributed about its perimeter, with these recesses constructed snugly to receive alternate or spaced links of a length of chain. Separating adjacent recesses are shoulder portions 46a, 46b. With a chain trained about sprocket 36, recesses 44 receive the horizontal links in a chain length, and a vertical link connecting these horizontal links seats between a corresponding pair of shoulder portions 46a, 46b.

Disposed opposite holding unit 30 on top of the lumber load, and with length of chain 20a extending through it and thence to the holding unit, is a running unit 52, somewhat similar in construction to unit 30. The running unit comprises upright frame plates 52a, 52b spaced laterally apart, with bottom edges 56, 57 of the plates operable to support the unit. Interconnecting and fixed to one set of ends of plates 52a, 52b is a brace plate 60, and journaled between the plates at the other set of ends is a chain sprocket or training wheel 62.

Brace plate 60 has an aperture 64 of circular outline provided in it, and chain length 20a extends through the aperture and thence to the holding unit 30 between plates 52a, 52b. The plates and aperture define a channel extending through the unit for receiving a reach of chain passed through the unit, without such reach connected to sprocket 62 mounted in the unit. Ordinarily, the chain length is not locked to the brace plate, but extends freely through aperture 64.

Sprocket 62, like sprocket 36 already discussed, has provided about its perimeter multiple recesses 66. These are separated by complementing sets of shoulder portions 68a, 68b. Chain trained about the sprocket positions itself with horizontal links fitted within the recesses, and with its cross or vertical links fitted between corresponding shoulder portions 68a, 68b. Plates 52′ also define a passage for receiving portions of chain passed through the unit with such portions of chain engaging sprocket 62.

Extending axially out from the ends of sprocket 62 are stub shafts 70, 72. These are joined to the chain sprocket and are used in rotating the sprocket manually.

Affixed to one of the stub shafts (shaft 70) and on one side of the running unit is a ratchet wheel 74. Spaced radially from the ratchet wheel, and secured to frame plate 52b, are a pair of guides 76, 78. Slidably mounted within suitable apertures provided the guides is a pawl member 80, with an engaging end 80a that engages the teeth of the ratchet wheel to inhibit rotation in a clockwise direction in FIGS. 2 and 3. A compression spring 82, with one end engaging guide 76 and its other end a shoulder on the pawl member urges the pawl member into locking engagement with the teeth of the ratchet wheel. The pawl members and ratchet constitute arresting mechanism operable to inhibit rotation of the sprocket in a direction where loosening of chain lengths joined by the units results.

Figure 6:
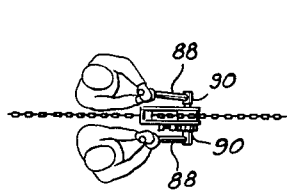
FIG. 6 is a view illustrating how a pair of workmen may actuate the mechanism to produce tensioning of the chain lengths in the mechanism.

Chain sprocket 62 is turned in a counterclockwise direction, or in a direction such as to cause tensioning of chain lengths joined by the running and holding units, by means of a detachable wrenches 88, shown in FIG. 6. One is fitted on each of the stub shafts 70, 72. Each has a lower socket end 90 that fits over a stub shaft. In using the mechanism of the invention, two workmen position themselves on either side of the running unit, and each grasps a wrench, as shown in FIG. 6. When such workmen pull the wrenches, the sprocket 62 is rotated in a direction producing tightening of a chain length trained thereover.

For quick release of the load-binding mechanism, a slot 86 is provided in the end of pawl member 80. Adapted to be fitted within the slot is a wedge 87 (see FIG. 3). To shift pawl member 80 to the left so that its engaging end moves out of engagement with the ratchet wheel, the wedge is fitted within slots 86, and then a sharp blow is imparted to the wedge, causing it to slide against guide 76 with the pawl member being forced free of the ratchet wheel.

Figure 7:
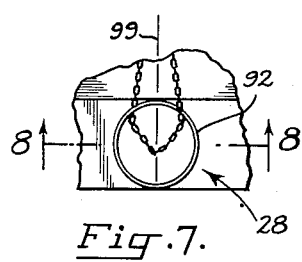
FIG. 7 is a top, plan view of means employed to anchor the end of a length of chain.
Figure 8:
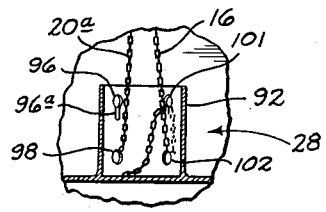
FIG. 8 is a sectional view taken generally along the line 8—8 in FIG. 7, and with portions removed.
Figure 4:
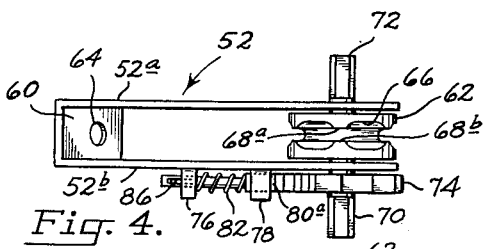
FIG. 4 is a top, plan view of the unit in FIG. 3.
Figure 5:
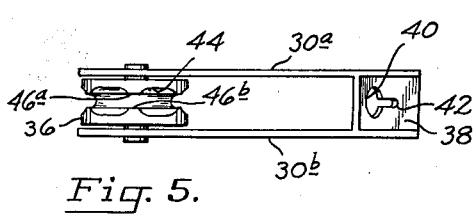
FIG. 5 is a top, plan view of the other unit shown in FIG. 2 (the holding unit)
Figure 3:
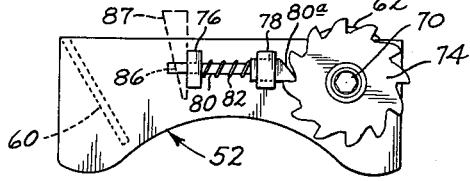
FIG. 3 is a view of one of the units shown in FIG. 2 (referred to as the running unit), illustrating release mechanism for releasing from tension a chain held by the unit.

Considering now anchoring means 28 used to connect the bottom set of ends of lengths of chain 20a, 20b to deck 12, and with reference to FIGS. 7 and 8, 92 indicates a well or tub, with an open top, and joined at its base to the deck of the lumber barge. In the side of the well or tub are a pair of vertically aligned apertures 96, 98. The top aperture 96 has a notch 96a at the base thereof, whereas the bottom aperture is circular in outline. A length of chain, such as length of chain 20a, is anchored in place by training it downwardly into the inside of the tub, then through bottom aperture 98, thence upwardly on the outside of the tub to the top aperture, and thence through aperture 96 where a link is locked in place by using notch 96a, in the same way that chain is locked to brace plate 38 of unit 30. The remainder of the chain may then be coiled inside the tub or well.

It will be noted with reference to FIG. 7 that apertures 96, 98 are disposed to one side of a plane 99 normal to the load of lumber and passing through the center of the tub. This is to provide some clearance between length of chain 22a and the load as it extends upwardly from the tub.

Expanse of chain 16 and cinching mechanism 18 employed for holding the lower level of lumber 15a in place are substantially the same as the expanse 20 and mechanism 22 just described. The lengths of chain of expanse 16 have their bottom ends also anchored in tub 92, by means of another set of apertures indicated at 101, 102 in FIG. 8.

Using the mechanism of the invention, it should be apparent that a minimum number of workmen may speedily secure a load of lumber on a deck with the load held firmly from shifting. Typically, first the holding and running units are properly positioned on top of the load, with such units spaced some distance apart. The end of one length of chain is then fastened to the holding unit, and the other length of chain is threaded through aperture 64, and thence trained about sprockets 36, 62, as shown. The two lengths of chain are then extended over opposite sides of the load, and any twists in the chain lengths removed. The bottom sets of the chain lengths may then be anchored in place, using tubs 92. Excess chain is coiled in the tubs in a protected and out-of-the-way position. Having anchored the ends of the chain lengths, a pair of workmen using the wrenches described turn chain sprocket 62, with length of chain 20a being taken in as the sprocket is turned. Because of the fact that length of chain 20a extends in two reaches between sprockets 36, 62, leverage is provided in the mechanism which facilitates tensioning of the chain.

Of particular importance is the presence of the chain sprockets in the two units, with alternate links of chain length 20a fitting snugly in the various recesses provided about the perimeters of the sprockets. By using such sprockets, tendencies for the pitch of the chain length to be altered because of tensions therein are eliminated. In effect, the pitch of the chain is maintained by the recesses which cradle alternate chain links. Note also that between the sprockets, the tension in the chain length is one-half the tension outside the sprockets, which also tends to inhibit changing in the pitch of the chain length.

While an embodiment of the invention has been described, various changes and modifications are possible without departing from the invention. It is desired not to be limited to the specific details of the embodiment illustrated, but to cover all modifications and variations that would be apparent to one skilled in the art, and that come within the scope of the appended claims.

It is claimed and desired to secure by Letters Patent:

1. In load-binding mechanism, a pair of oppositely disposed lengths of chain extending up from each side of the load having one set of ends on top of the load, means detachably anchoring the other set of ends of the chain lengths on opposite sides of the load, a holding unit detachably connected to one end of one chain length and having a frame and a training wheel journaled thereon, a running unit spaced toward the other side of the load from said holding unit having a frame separate from the frame of the holding unit and a training wheel journaled thereon, said one end of the other chain length extending from said running unit around the training wheel of said holding unit and thence about the training wheel of said running unit, mechanism connected to the training wheel of one of the units for turning the wheel in a direction to produce tensing of the chain lengths, and mechanism for inhibiting rotation of the training wheel of said one unit in the opposite direction.

2. In a bound load, the combination of a pair of elongated tension members anchored at end portions on either side of the load and extending up along the sides and over the top of the load, a pair of units separate from each other mounted on top of the load and each having a frame supported on the load for movement over the load, a wheel journaled on each unit, one of the tension members being detachably connected to one of the units, the other of the tension members being trained over said wheels with the member extending in at least two reaches between the wheels, and means inhibiting rotation of at least one of said wheels.

3. In a bound load, the combination of a pair of elongated chains anchored at end portions on either side of the load and extending up along the sides and over the top of the load, a pair of units separate from each other mounted on top of the load and each having a frame supported on the load for movement over the load, a sprocket journaled on each unit, one of the chains being detachably connected to one of the units, the other of the chains being trained over said sprockets with the member extending in at least two reaches between the sprockets, and pawl and ratchet means operatively connected to at least one of the sprockets inhibiting rotation of the sprocket.

4. Means for binding a load on a support comprising elongated tie-down means adapted to be tensioned and to be placed over the load and in operative position operable to hold such a load in place, anchoring means for anchoring each end of said elongated tie-down means with the same in operative position and with intermediate portions thereof over a load, at least one of said tie-down means comprising a length of chain links, said anchoring means for at least said one end of said tie-down means comprising a container including an encircling wall with an aperture in said wall, said aperture having a shape that snugly receives any one link of plural ones of said chain links with the links on either side from the link received in the aperture locked from passing therethrough, said aperture thus providing for positive attachment with the tie-down means at any one of multiple locations along its length, the inside of said container providing a recess for holding excess portions of said tie-down means, and means between the ends of said tie-down means for shortening the expanse thereof between the ends thereof thus to produce tension therein.

5. A unit for tensioning chain comprising a frame, said frame having a base defining a support plane for the unit and adapted to support the unit on a surface with the unit movable over said surface, a sprocket journaled on an upper portion of said frame in a position above and clear of a surface supporting said base, a channel extending through the unit for receiving a reach of chain passed through the unit with such chain disconnected from the sprocket, a passage extending through the unit for receiving portions of chain passed through the unit and engaging said sprocket, and means connected to said sprocket for turning the sprocket, the latter means being mounted on said frame above and clear of a surface supporting said base together with said sprocket.

6. A unit for tensioning an elongated length of chain comprising a frame including laterally spaced plates with skid bottoms defining a support plane for the unit and adapted to slide on a surface, a chain sprocket journaled on an upper portion of said frame between said plates with the base thereof above and clear of said plane, a channel between said plates and extending through the unit for receiving a reach of chain passed through the unit with such chain disconnected from the sprocket, a passage extending through the unit for receiving portions of chain passed through the unit and engaging said sprocket, means connected to said sprocket for rotating the sprocket, the latter means being above and clear of said plane, and means operatively connected to said sprocket for inhibiting its rotation in one direction.

7. The unit of claim 6, wherein the means operatively connected to said sprocket for inhibiting its rotation comprises a pawl and ratchet, said pawl being mounted on said frame in a position substantailly paralleling a chain extending through the unit, and which further comprises wedge means extending transversely of said pawl and adapted to be shifted transversely of a chain extending through the unit for quick release of said pawl from said ratchet.

8. For binding a load, the combination of a pair of elongated tension members with spaced-apart end portions adapted to be secured on either side of a load, a pair of mechanisms spaced apart from each other and adapted to be supported on top of a load, each of said mechanisms including a frame supporting it for movement over the load toward the other mechanism, each of said mechanisms also including a wheel journaled on its frame and supported by the frame out of contact with a load, one of said tension members having an end portion opposite its said one end portion that is detachably connected to one of said mechanisms, the other of said tension members having an end portion opposite its said one end portion that extends from the other of said mechanisms to said one mechanism and thence is trained over said wheels whereby it extends in at least two reaches between said wheels, and means for inhibiting rotation of the wheel of one of said mechanisms.

9. The combination of claim 8, wherein the means inhibiting rotation of the wheel comprises a pawl and ratchet operatively connected to the wheel, and which further comprises quick-release means for releasing said pawl and ratchet including a member actuated by movement in a direction extending transversely of said tension members.

References Cited in the file of this patent
UNITED STATES PATENTS

| | | |
|---|---|---|
| 1,199,583 | McConnohie | Sept. 26, 1916 |
| 1,287,313 | Hoffland | Dec. 10, 1918 |
| 1,957,943 | Delano | May 8, 1934 |
| 2,052,914 | Williams | Sept. 1, 1936 |
| 2,637,524 | Huvendick | May 5, 1953 |
| 3,007,422 | Brotton | Nov. 7, 1961 |